United States Patent
Hoellinger

(10) Patent No.: US 6,630,642 B2
(45) Date of Patent: Oct. 7, 2003

(54) WELDING APPARATUS FOR SLEEVES

(75) Inventor: Wolfgang Hoellinger, Munich (DE)

(73) Assignee: HBS Boizenschweiss-Systeme GmbH & Co. KG, Dachau (DE)

( * ) Notice: Subject to any disclaimer, the term of this patent is extended or adjusted under 35 U.S.C. 154(b) by 9 days.

(21) Appl. No.: 10/082,193

(22) Filed: Feb. 26, 2002

(65) Prior Publication Data

US 2002/0117496 A1 Aug. 29, 2002

(30) Foreign Application Priority Data

Feb. 27, 2001 (DE) ............................ 101 09 367

(51) Int. Cl.[7] .................................................. B23K 9/20
(52) U.S. Cl. .......................... 219/98; 219/74; 219/123
(58) Field of Search ...................... 219/98, 99, 123, 219/137.62, 74

(56) References Cited

U.S. PATENT DOCUMENTS 2,473,871 A * 6/1949 Edels ........................... 219/98
3,555,238 A * 1/1971 Fay et al. ..................... 219/98
5,508,492 A 4/1996 Pajerski et al.

FOREIGN PATENT DOCUMENTS

| DE | 44 00 957 C1 | 3/1995 |
|---|---|---|
| DE | 295 05 613 U1 | 3/1995 |
| DE | 198 15 274 A1 | 10/1999 |
| JP | 10024368 A | 1/1998 |

* cited by examiner

*Primary Examiner*—Clifford C. Shaw
(74) *Attorney, Agent, or Firm*—Barnes & Thornburg

(57) ABSTRACT

For arc welding a sleeve 3 to a workpiece surface 2, a sleeve holder 1 is surrounded by a field-former unit which contains a magnet coil 4, a magnetic flux return member 6 and a field former 7. A magnetic field is generated with a field component extending radially to the sleeve 3 within the welding gap to set the arc in rotation. To ensure a constant magnetic flux, the field-former unit, in particular its magnet coil 4, is cooled by a temperature-controlled cooling medium circulated through the welding head.

9 Claims, 1 Drawing Sheet

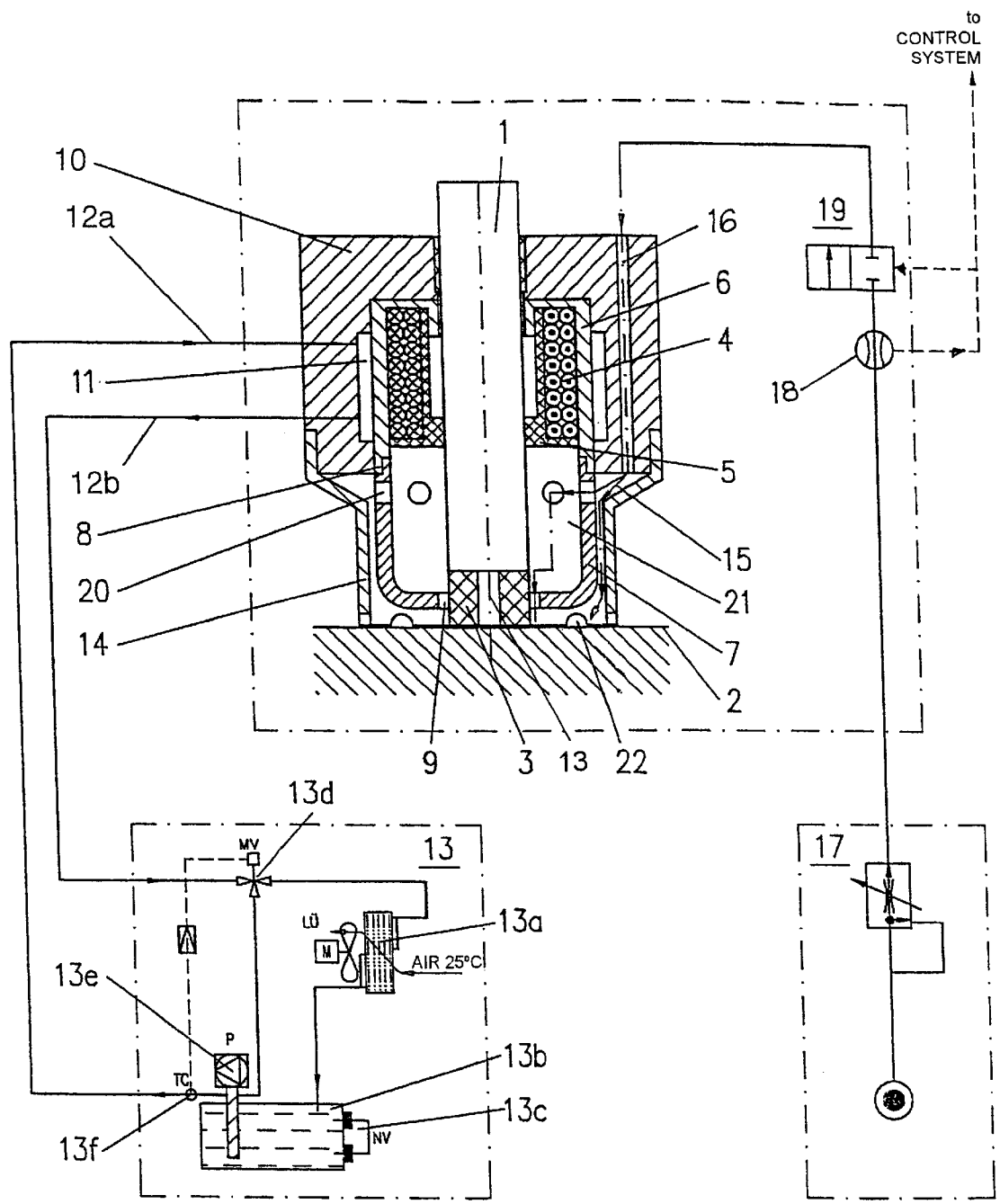

WELDING APPARATUS FOR SLEEVES

BACKGROUND OF THE INVENTION

The present invention relates a welding apparatus for welding a hollow stud or sleeve end-on to a workpiece surface.

DE 44 00 957 C1 and DE 295 05 613 U1 disclose welding apparatus for welding sleeves to workpieces. The known apparatus comprise a housing, a sleeve holder, a magnet coil surrounding the sleeve holder, a magnetic flux return member surrounding the coil, and a magnetic field former coupled to the flux return member for producing a magnetic field with a field component that extends radially to the sleeve within the welding gap. The radial magnetic-field component generated within the gap imparts a force to the arc to move the arc along an annular path corresponding to the annular end face of the sleeve to be welded to the workpiece.

For optimum welding results, constant welding parameters, in particular constant magnetic-field parameters, are necessary. Due to the relatively long welding and coil operating times (up to 1 s in the case of a 30 mm sleeve diameter), the magnet coil and field former are heated. This tends to affect the magnetic-field parameters, thus leading to changes in the arc movement and ultimately impairing quality of the weld. In conventional welding apparatus, therefore, sufficiently long periods are required for cooling the welding head between successive welding operations.

JP 10024368 A shows a welding torch surrounded by a magnetic coil which generates a magnetic field around the torch to agitate the molten metal. The coil is scavenged by a cooling fluid.

U.S. Pat. No. 5,508,492 A discloses an apparatus for graining the surface of a travelling electrically conductive workpiece by means of an arc which is produced by a coil embedded in a ceramic member. Cooling is provided by a coolant tube inserted in a groove that is formed in a further structural part surrounding the ceramic member.

It is an object of the invention to avoid at least some of the disadvantages as occur in comparable prior art welding apparatus. As a more specific object the invention seeks to provide may a welding apparatus which permits the welding of sleeves to workpieces with a high cycle rate and high quality.

SUMMARY OF THE INVENTION

To meet the above object, the present invention provides a welding apparatus for welding a sleeve to a workpiece. The apparatus comprises a housing, a sleeve holder for holding a sleeve so as to define a welding gap between the sleeve and the workpiece, a magnet coil surrounding the sleeve holder, a magnetic flux return member surrounding the magnet coil, a magnetic field former coupled to the magnetic flux return member for producing a magnetic field with a field component that extends radially to the sleeve within the welding gap, and cooling means for cooling the magnet coil. The cooling means includes an annular groove formed in the housing and having its inner side closed off by the magnetic flux return member, and means for supplying a cooling fluid to the annular groove.

The cooling of the magnet coil according to the invention is effective to produce a constant magnetomotive force of the field former and a more uniform magnetic field in the welding gap, resulting in an improved reproducibility and reliability of the welds and simultaneously permitting high cycle rates.

In a preferred embodiment, the magnetic flux return member and the housing are made of a heat-conducting material, the housing material being preferably aluminum. This further improves the cooling of the magnet coil and results in a structure that is easy to assemble.

The annular groove may be connected to a temperature-regulating unit so that the cooling fluid is supplied at a temperature a few degrees above the ambient temperature. Adequate cooling can thus be achieved without the danger of dew forming of in the welding region.

In accordance with another advantageous embodiment, the field former is exposed to a flow of shielding gas. The housing may have an apron-like extension surrounding the field former so as to define an intermediate space between the extension and the field former, and the shielding gas may be supplied to such intermediate space. Further, the field former may have through-openings for passing the shielding gas into its interior space. A flow of shielding gas may thus be utilized for cooling purposes.

In addition, the sleeve holder may have an axially extending through-bore for the passage of shielding gas.

Further objects, features and advantages will appear from the following description of a preferred embodiment with reference to the drawing.

BRIEF DESCRIPTION OF THE DRAWING

The only FIGURE of the drawing shows a schematic section through a welding head with cooling arrangements and shielding-gas supplies.

DETAILED DESCRIPTION OF PREFERRED EMBODIMENT

The sleeve welding apparatus shown in the drawing has a sleeve holder 1 which is made of a ferromagnetic material and which, at its end facing the workpiece surface 2, carries a sleeve 3 to be welded end-on to the surface 2. The sleeve 3 is attached to the sleeve holder 1 in an electrically conductive manner via a clamping device (not shown). In the welding operation, the sleeve holder 1 is moved by a linear actuator (not shown).

Arranged coaxially to the sleeve holder 1 is an annular electromagnetic coil 4 which sits on a plastic coil holder 5 directly surrounding the sleeve holder 1. The coil holder 5 at the same time serves as a sliding bearing for the axially displaceable sleeve holder 1.

The magnet coil 4 is tightly enclosed by a pot-shaped magnetic flux return member 6, which is magnetically coupled at its top end to the sleeve holder 1. The bottom end of the flux return member 6 is connected via a thread 8 and magnetically coupled to a likewise pot-shaped field former 7 of ferromagnetic material. At its bottom end, the field former 7 forms an annular gap 9 surrounding the sleeve 3.

The sleeve holder 1 and the field-former unit formed from the components 4, 6 and 7 are inserted into a welding-head housing 10 which is made of aluminum and has cooling ribs (not shown). An annular groove 11 of rectangular cross section is provided in the cylindrical inner surface of the housing 10 and is closed by the flux return member 6.

The groove 11 is supplied with medium from a temperature-regulating unit 13 via an inlet line 12*a* and a return line 12*b*. The unit 13 includes a water-circulation cooling system, which comprises a heat exchanger 13*a* with axial fan, a water tank 13*b* with a filling-level sensor 13*c*, a manually adjustable mixing valve 13*d*, a pump 13*e*, and a thermostat 13*f*. The pump 13*e* delivers cooling water from the water tank 13*b* via the inlet line 12*a* into the annular passage 11, and the heated water flows through the return line 12 into the heat exchanger 13*a*, is cooled down therein and flows back into the water tank 13*b*.

The desired inlet temperature, which can be set by the thermostat 13*f*, is typically 5° C. above the ambient temperature in order to avoid the formation of dew on the coil 4. The dimensions of the annular groove 11 and the flow volume of the cooling water are selected so that a critical temperature of about 55° C. at the coil 4 is not exceeded.

An apron-like extension 14 formed at the lower end of the housing 10 extends coaxially to the sleeve holder 1 closely down to the workpiece surface 2. A feed passage 16 which is connected to a shielding-gas source 17 opens into a space 15 intermediate the extension 14 and the field former 7. The shielding-gas feed is regulated via a volumetric flow sensor 18 and a solenoid stop valve 19, which are connected to a control system (not shown) When the gas feed is open, shielding gas flows both into the intermediate space 15 between the apron-like extension 14 and the field former 7 and, via through-openings 20 in the field former 7, into the space 21 inside the latter. The partial flow into the interior space 21 further passes through the annular gap 9 at the sleeve 3, combines with the partial flow from the intermediate space 15 and discharges from the welding head via discharge openings 22 formed in the extension 14.

The flow of the shielding gas as shown not only results in efficient purging of the welding environment, but is at the same time utilized for further cooling of the field former 7 and thus also of the coil 4.

The field former 7 and apron-like extension 14 are provided with a contamination-inhibiting PTFE coating. The shielding gas prevents over-heating of this coating and prolongs its service life.

Alternatively or additionally, shielding gas may be fed via a coaxial bore 23 of the sleeve holder 1. From the lower end of the sleeve holder 1, a part of this gas will pass through the sleeve 3 and another part will exit radially outward into the intermediate space 15.

The welding apparatus described above may be part of a hand-held welding gun or, in particular, of a fully or partly automated welding system in which the movement of the sleeve holder or of the entire welding head is effected, for example, by an electric linear drive with displacement speed control.

What is claimed is:

1. A welding apparatus for welding a sleeve to a workpiece, comprising a housing, a sleeve holder for holding a sleeve so as to define a welding gap between the sleeve and the workpiece, a magnet coil surrounding said sleeve holder, a magnetic flux return member surrounding said magnet coil, a magnetic field former coupled to said magnetic flux return member for producing a magnetic field with a field component that extends radially to the sleeve within said welding gap, and cooling means for cooling said magnet coil, said cooling means including an annular groove formed in said housing and having an inner side closed off by said magnetic flux return member, and means for supplying a cooling fluid to said annular groove.

2. The apparatus of claim 1, wherein said magnetic flux return member is made of a heat-conducting material.

3. The apparatus of claim 1, wherein said housing is made of a heat-conducting material.

4. The apparatus of claim 3, wherein said heat-conducting material is aluminum.

5. The apparatus of claim 1, wherein said annular groove is connected to a temperature-regulating unit for supplying said cooling fluid at a temperature a few degrees above the ambient temperature.

6. The apparatus of claim 1, further comprising means for supplying shielding gas to said the field former.

7. The apparatus of claim 6, wherein said housing has an extension surrounding said field former so as to define an intermediate space between said extension and said field former, and wherein said shielding gas is supplied to said intermediate space.

8. The apparatus of claim 7, wherein said field former has through-openings for passing shielding gas into an interior space of the field former.

9. The apparatus of claim 1, wherein said sleeve holder has an axially extending through-bore for the passage of shielding gas.

* * * * *